_(12)_ United States Patent
Oda et al.

(10) Patent No.: US 11,402,295 B2
(45) Date of Patent: Aug. 2, 2022

(54) OPTICAL FIBER LOSS MEASUREMENT DEVICE AND OPTICAL FIBER LOSS MEASUREMENT METHOD

(71) Applicant: Nippon Telegraph and Telephone Corporation, Tokyo (JP)

(72) Inventors: Tomokazu Oda, Musashino (JP); Hiroshi Takahashi, Musashino (JP); Kunihiro Toge, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/269,151

(22) PCT Filed: Aug. 14, 2019

(86) PCT No.: PCT/JP2019/031969
§ 371 (c)(1),
(2) Date: Feb. 17, 2021

(87) PCT Pub. No.: WO2020/040019
PCT Pub. Date: Feb. 27, 2020

(65) Prior Publication Data
US 2021/0310897 A1 Oct. 7, 2021

(30) Foreign Application Priority Data
Aug. 22, 2018 (JP) .............................. JP2018-155773

(51) Int. Cl.
*G01M 11/00* (2006.01)
*G01M 11/02* (2006.01)

(52) U.S. Cl.
CPC ...... *G01M 11/319* (2013.01); *G01M 11/0207* (2013.01)

(58) Field of Classification Search
CPC ............. G01K 11/322; G01D 5/35364; G01D 5/35358; G01B 11/168; G01M 11/319;
(Continued)

(56) References Cited

U.S. PATENT DOCUMENTS 8,493,556 B2 * 7/2013 Li .......................... G01K 11/32
356/73.1
2018/0057396 A1 * 3/2018 Li ..................... C03B 37/02763

FOREIGN PATENT DOCUMENTS

KR 20160135005 A * 11/2016

OTHER PUBLICATIONS

K. Ozaki, et al., *Effective Mode Field Diameter Definition and Splice Loss Estimation of $LP_{11}$ Mode in Few Mode Fibers*, Asia Communications and Photonics Conference, ATh3A. 98 (2014), pp. 1-3.

(Continued)

*Primary Examiner* — Hoa Q Pham
(74) *Attorney, Agent, or Firm* — Workman Nydegger

(57) ABSTRACT

An optical fiber loss measurement device includes a unit configured to input pump light at a first frequency in a predetermined mode to a measurement target optical fiber in which a plurality of modes propagate from a first end, and input probe light at a second frequency to which a Brillouin frequency shift is applied to a second end, a Brillouin gain acquisition unit configured to measure an intensity of light output from the first end to acquire Brillouin gains in a longitudinal direction of the measurement target optical fiber using a BOTDA method, and a unit configured to measure a loss in the predetermined mode of the measurement target optical fiber, and the probe light is in a mode in which an electric field distribution in a cross section of the measurement target optical fiber is axisymmetric.

7 Claims, 4 Drawing Sheets

(58) Field of Classification Search
CPC .... G01M 11/39; G01M 11/083; G01M 11/02; G01M 11/3172; H04B 10/071
USPC ........................................ 356/73.1; 398/9–38
See application file for complete search history.

(56) References Cited

OTHER PUBLICATIONS

M. Nakazawa et al., *Measurement of Mode Coupling Distribution Along a Few-Mode Fiber Using a Synchronous Multi-Channel OTDR*, Opt. Express, vol. 22, Issue 25, (2014), pp. 31299-31309.
H. Takahashi, et al., *Distributed Measurement of Single-way Intermodal Crosstalk in Spliced FMFs Based on BOTDA*, Proc. OFC 2017, Th4H.3 (2017), pp. 1-11.
H. Takahashi, et al., *Individual Loss Distribution Measurement in 32-Branched PON Using Pulsed Pump-Probe Brillouin Analysis*, Opt. Express, vol. 21, Issue 6, (2013), pp. 6739-6748.

* cited by examiner

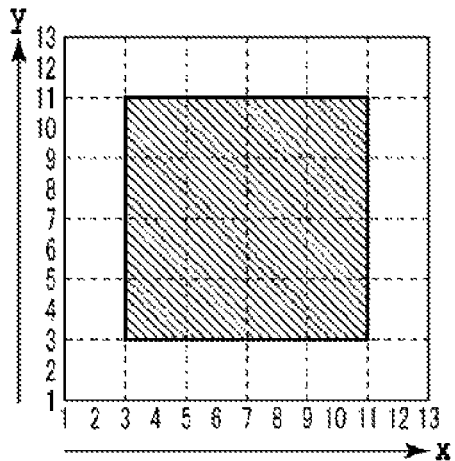
Fig. 2(a) PROBE LIGHT
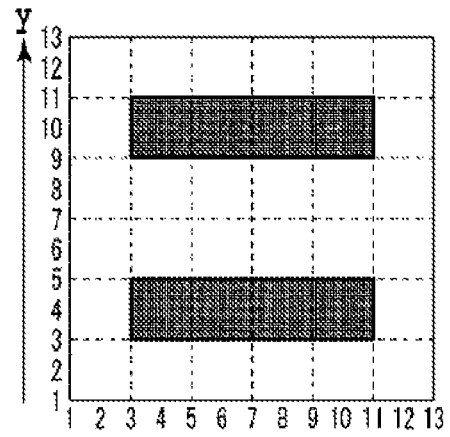
Fig. 2(b) PUMP LIGHT
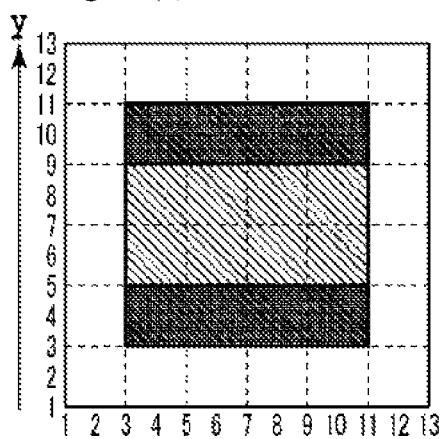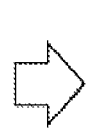
Fig. 2(c) INTERACTION
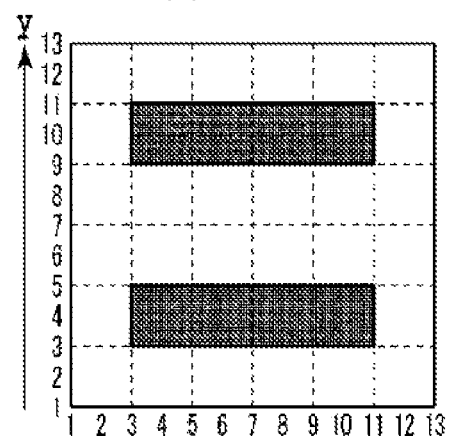
Fig. 2(d) BRILLOUIN GAIN

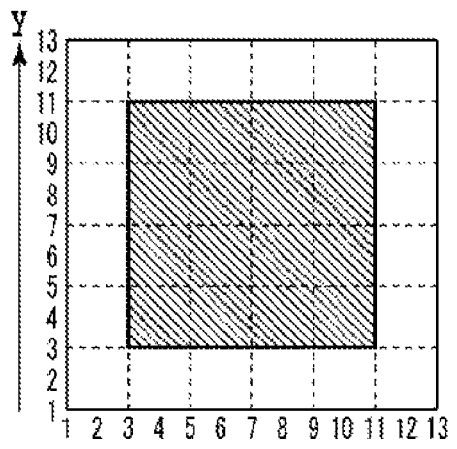
Fig. 3(a) PROBE LIGHT
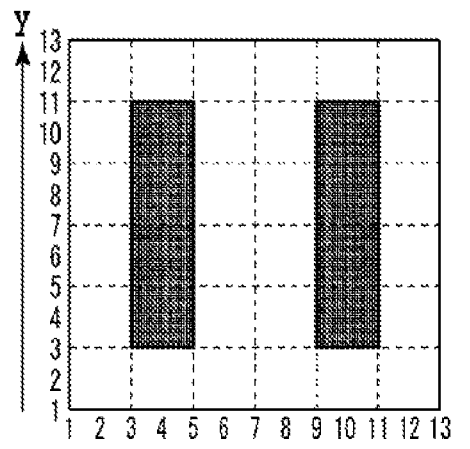
Fig. 3(b) PUMP LIGHT
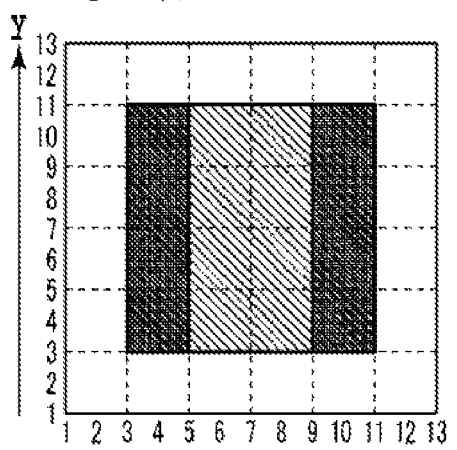
Fig. 3(c) INTERACTION
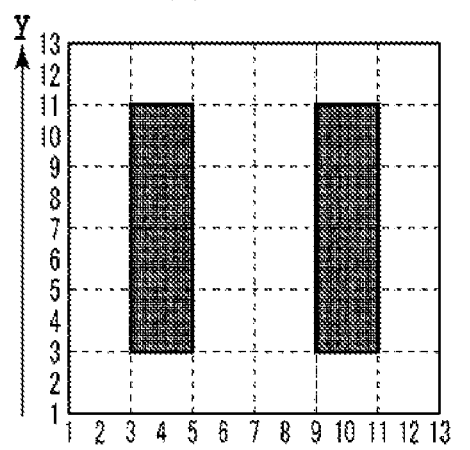
Fig. 3(d) BRILLOUIN GAIN

OPTICAL FIBER LOSS MEASUREMENT DEVICE AND OPTICAL FIBER LOSS MEASUREMENT METHOD

TECHNICAL FIELD

The present disclosure relates to an optical fiber loss measurement device and an optical fiber loss measurement method, and more specifically, to an optical fiber loss measurement device and an optical fiber loss measurement method for nondestructively measuring, in a longitudinal direction, a loss from which each propagation mode propagating in an optical fiber suffers.

BACKGROUND ART

In recent years, with the rapid increase in transmission traffic, a Few Mode Fiber (FMF) or a Multi Mode Fiber (MMF) in which a plurality of propagation modes can be used, instead of a Single Mode Fiber (SMF) that is used in current transmission lines, has attracted a lot of attention as a fiber that enables a further increase in capacity. In these optical fibers, because crosstalk coupling to a plurality of modes occurs during propagation, mode division multiplexing communication is implemented by compensating for the crosstalk through signal processing on the receiving side.

Meanwhile, when a loss difference between modes is generated due to a difference in loss from which each mode suffers, the crosstalk cannot be compensated for. Thus, it is necessary to reduce the loss difference between modes in a transmission line. The loss difference between modes is typically generated at a device such as an Erbium Doped optical Fiber Amplifier (EDFA) or a mode multiplexer and demultiplexer, or at a connection point of an optical fiber. That is, it is necessary to measure a loss in each mode in a longitudinal direction of the optical fiber.

A cause of the difference in the loss from which each mode suffers is the difference in shape of an electric field distribution in an optical fiber cross section fiber. The electric field distribution shows a different shape in the optical fiber cross section for each mode, and is divided into two main types including a mode in which an intensity is axisymmetric ($LP_{0j}$ mode) and a mode in which an intensity is not axisymmetric ($LP_{ij}$ mode). For the non-axisymmetric $LP_{1j}$ mode, there is also variation in an angular of an axis of the optical fiber cross section, in addition to the shape of a propagation mode. In this case, in the non-axisymmetric mode, a loss varies depending on a rotation angle of the mode even in the same mode (Non Patent Literature 1). Thus, in these modes, it is necessary to change a rotation of the mode such as rotation of a phase plate to acquire the loss from which the mode suffers at that time.

Hitherto, Optical Time Domain Reflectometry (OTDR) has been proposed as a method of measuring a loss in a longitudinal direction of an optical fiber (Non Patent Literature 2). However, in OTDR, loss measurement is performed using Rayleigh scattering generated in the optical fiber, but because a plurality of modes are generated in this scattering process, information in which there are a plurality of modes is obtained and pure loss in each mode is not obtained. For example, when a loss in an $LP_{11}$ mode is acquired, the loss in the $LP_{11}$ mode is measured to be lower than an actual loss in a case in which there is also an $LP_{01}$ mode that generally has a smaller loss than in the $LP_{11}$ mode. Thus, a loss measurement method using backscattered light generated in an optical fiber has a problem in that an influence of generation of a plurality of modes cannot be eliminated and a loss in each mode cannot be correctly evaluated.

Thus, in the related art, OTDR has been mainstream for measurement of a loss in each mode, but a Brillouin gain analysis method (BOTDA: Brillouin Optical Time Domain Analysis) using stimulated Brillouin scattering (Non Patent Literature 3) has been proposed as a scheme for evaluating propagation characteristics in each mode in an optical fiber in which a plurality of modes propagate. In BOTDA, it is possible to observe the propagation characteristics of each mode in the longitudinal direction of the optical fiber using the fact that only a specific mode can be generated in the optical fiber, through control of a frequency difference between pump light and probe light inputted to the optical fiber.

CITATION LIST

Non Patent Literature

Non Patent Literature 1: K. Ozaki, et al., Asia Communications and Photonics Conference, ATh3A. 98 (2014).

Non Patent Literature 2: M. Nakazawa et al., Opt. Express, Vol. 22, Issue 25, pp. 31299-31309 (2014).

Non Patent Literature 3: H. Takahashi, et. al., Proc. OFC 2017, Th4H.3 (2017).

Non Patent Literature 4: H. Takahashi, et. al., Opt. Express, Vol. 21, Issue 6, pp. 6739-6748 (2013).

SUMMARY OF THE INVENTION

Technical Problem

However, when a loss in each mode is measured using BOTDA, a Brillouin gain generated in the optical fiber has characteristics that a generation amount changes depending on not only a loss in the mode but also polarization states of the modes or overlapping of the electric field distributions of the pump light and the probe light, and as a result, the loss in each mode cannot be measured correctly. In this respect, because the SMF used so far uses only the $LP_{01}$ mode that is a basic mode, overlapping of the electric field distributions of the pump light and the probe light is always the same, and for a polarization state, a generated gain amount is made polarization-independent by a polarization scrambler or the like (Non Patent Literature 4).

On the other hand, in the FMF or MMF in which a plurality of modes propagate, when a polarization of the $LP_{11}$ mode is changed, the electric field distribution also changes at the same time. Further, because these modes are accompanied by a change such as a rotation of the electric field distribution in an azimuth direction of the optical fiber cross section at the time of propagation, use of such modes for both the pump light and the probe light also causes a problem in that an overlapping state in a longitudinal direction changes.

In an optical fiber in which the plurality of modes propagate in this way, even when an attempt is made to measure a loss in each mode using BOTDA capable of evaluating propagation characteristics in each mode, it is not possible to measure a loss in each mode and each mode rotation from the generated gain amount.

The present disclosure has been made in view of the above-described problems of the related art, and an object of the present disclosure is to provide an optical fiber loss measurement device capable of accurately measuring a loss in a predetermined mode at each position of an optical fiber in an optical fiber in which a plurality of modes propagate.

Means for Solving the Problem

In order to solve the above-mentioned problem, an optical fiber loss measurement device described in an embodiment is an optical fiber loss measurement device including a light incidence unit configured to input, to a measurement target optical fiber in which a plurality of modes propagate, light at a first frequency in a predetermined mode as pump light, and input, to the measurement target optical fiber, light at a second frequency lower than the first frequency by a frequency corresponding to a Brillouin frequency shift in the predetermined mode as probe light, a Brillouin gain acquisition unit configured to measure an intensity of light output from the measurement target optical fiber to acquire Brillouin gains in a longitudinal direction of the measurement target optical fiber using a Brillouin Optical Time Domain Analysis (BOTDA) method, and a unit configured to measure a loss in the predetermined mode of the measurement target optical fiber by comparing magnitudes of the Brillouin gains at respective positions in the longitudinal direction of the measurement target optical fiber, in which the probe light is in a mode in which an electric field distribution in a cross section of the measurement target optical fiber is axisymmetric regardless of the mode of the pump light.

An optical fiber loss measurement method described in another embodiment is an optical fiber loss measurement method including inputting, to a measurement target optical fiber in which a plurality of modes propagate, light at a first frequency in a predetermined mode of the plurality of modes as pump light, and inputting, to the measurement target optical fiber, light at a second frequency lower than the first frequency by a frequency corresponding to a Brillouin frequency shift in the predetermined mode as probe light, measuring an intensity of light output from the measurement target optical fiber to acquire Brillouin gains in a longitudinal direction of the measurement target optical fiber using a Brillouin Optical Time Domain Analysis (BOTDA) method, and measuring a loss in the predetermined mode of the measurement target optical fiber by comparing magnitudes of the Brillouin gains at respective positions in the longitudinal direction of the measurement target optical fiber, in which the probe light is in a mode in which an electric field distribution in a cross section of the measurement target optical fiber is axisymmetric regardless of the mode of the pump light.

BRIEF DESCRIPTION OF DRAWINGS

FIG. 2 is a diagram illustrating pump light and probe light at point A and interaction therebetween.

FIG. 3 is a diagram illustrating pump light and probe light at point B and interaction therebetween.

DESCRIPTION OF EMBODIMENTS

Hereinafter, embodiments of the present disclosure will be described in detail.

The optical fiber loss measurement device of the present embodiment can acquire a Brillouin gain generated by causing pump light in a predetermined mode to be inputted to one side of the optical fibers and causing probe light in a mode in which an electric field distribution in the cross section of the optical fiber is axisymmetric to be inputted to one side or the other side, and compare magnitudes of the Brillouin gains at respective positions in the longitudinal direction of the optical fiber to measure the loss in the predetermined mode in the optical fiber in a distributed manner in the longitudinal direction.

First Embodiment

Figure 1:
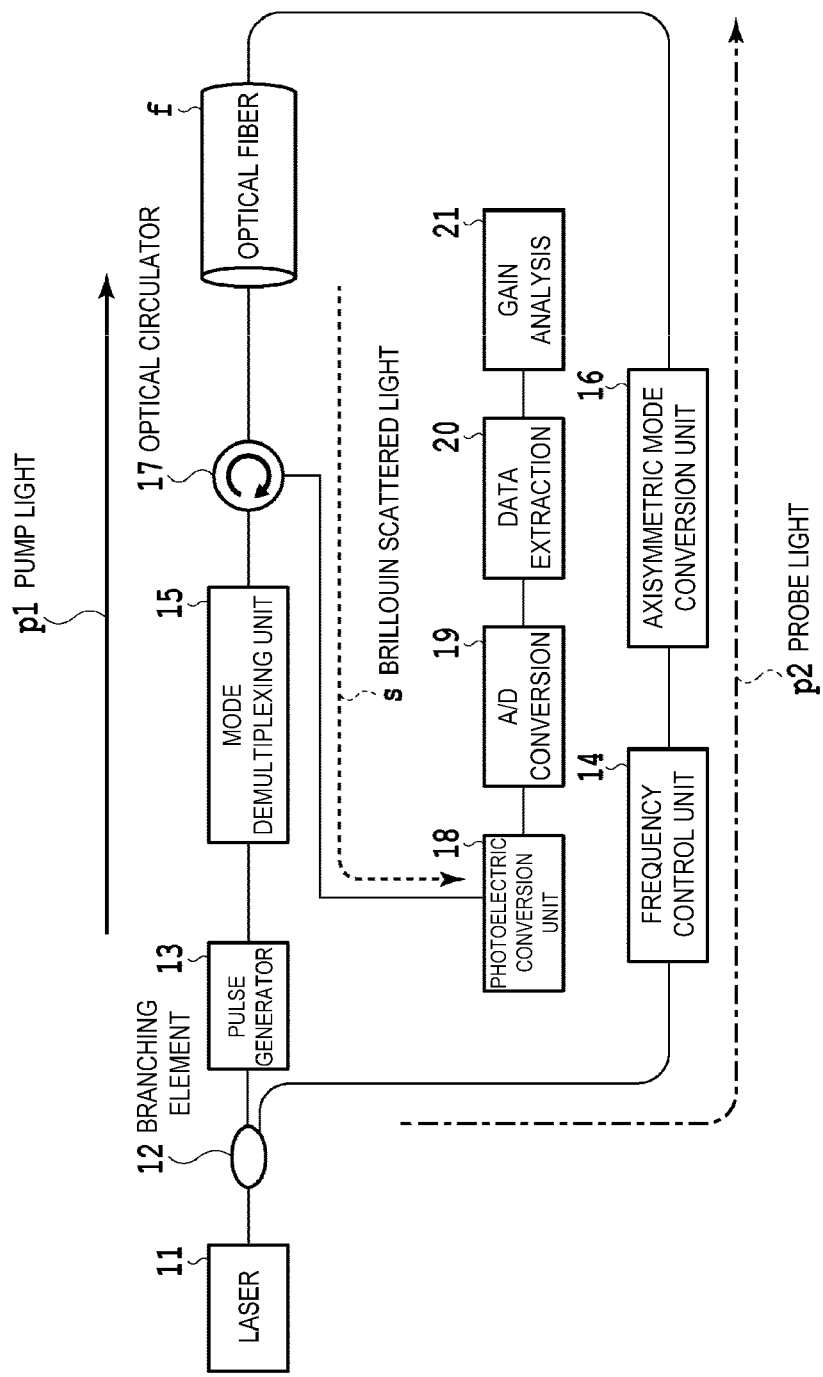
FIG. 1 is a diagram illustrating an example of an optical fiber loss measurement device according to a first embodiment.

FIG. 1 is a diagram illustrating an example of an optical fiber loss measurement device according to a first embodiment. The optical fiber loss measurement device of the present embodiment illustrated in FIG. 1 includes a laser light generation unit 11, a branching element 12 of which an input side is connected to the laser light generation unit 11, a pulse generator 13 connected to one of two branches by the branching element 12, a frequency control unit 14 connected to the other of the two branches, a mode demultiplexing unit 15 connected to the pulse generator 13, an optical circulator 17 connected to the mode demultiplexing unit 15, a measurement target optical fiber f of which one end is connected to the optical circulator 17, a photoelectric conversion unit 18, an A/D conversion unit 19, a data extraction unit 20, and a gain analysis unit 21 connected in series to the photoelectric conversion unit 18, and an axisymmetric mode conversion unit 16 provided between the frequency control unit 14 and the other end of the measurement target optical fiber f.

In the optical fiber loss measurement device of the present embodiment, the light output from the laser light generation unit 11 that generates coherent light is branched into two by the branching element 12. One of the two branch light beams is used as pump light p1, is converted to a pulse by the pulse generator 13, and then converted from the basic mode to a higher-order propagation mode corresponding to the measurement target optical fiber f by the mode demultiplexing unit 15. And then, the resultant light is inputted to the measurement target optical fiber f.

The mode demultiplexing unit 15 can use a phase plate, a PLC, a spatial optical modulator, or the like, and converts a mode of the pump light p1 to a propagation mode in which a loss is to be obtained. The mode demultiplexing unit 15 can convert the pump light p1 to an axisymmetric mode or a non-axisymmetric mode and input resultant light to the measurement target optical fiber f via the optical circulator 17.

The mode demultiplexing unit 15 may include a non-axisymmetric mode rotator that rotates the electric field distribution in the optical fiber cross-sectional direction in order to make it possible to evaluate loss characteristics of each rotation state of the mode in a cross-sectional direction (an optical fiber cross-sectional direction) of the measurement target optical fiber f when the mode demultiplexing unit 15 converts the pump light p1 to a non-axisymmetric mode.

The frequency control unit 14 provides, to the probe light p2 that is the other branch light, a frequency difference of about 10 to 11 GHz, which is equivalent to a Brillouin frequency shift corresponding to a combination of the modes of the pump light and the probe light inputted to the measurement target optical fiber f. This frequency control unit 14 may use an external modulator such as an SSB modulator composed of $LiNb_3$, or may use two lasers having different frequencies (wavelengths) to control an optical frequency difference between the two lasers. For a Brillouin frequency shift corresponding to the combination of the modes of the pump light and the probe light, a Brillouin frequency shift amount in the mode of the pump light can be used. Specifically, it is possible to set a frequency of the probe light to a frequency lower than a frequency of the pump light by a frequency corresponding to the Brillouin frequency shift in a predetermined mode.

The axisymmetric mode conversion unit 16 converts the probe light p2 to which a frequency difference is provided, to an axisymmetric propagation mode, and input resultant light to the measurement target optical fiber f from a direction opposite to the pump light p1. For the axisymmetric mode conversion unit 16, the same configuration as that of the mode demultiplexing unit 15 may be used, or the SMF and the FMF may be directly connected when the basic mode among axisymmetric modes is used.

When the pump light p1 and the probe light p2 are inputted to both ends of the measurement target optical fiber f, a Brillouin gain is generated in the probe light output toward the optical circulator 17 due to collision of the pump light p1 and the probe light p2 at each position in the longitudinal direction of the measurement target optical fiber f. In FIG. 1, the probe light that is received this Brillouin gain is illustrated as Brillouin scattered light s.

The optical circulator 17 sends the probe light p2 (the Brillouin scattered light s) amplified by the pump light p1 to the photoelectric conversion unit 18. The photoelectric conversion unit 18 converts a light intensity of the amplified probe light p2 (the Brillouin scattered light s) to an electrical signal, the A/D conversion unit 19 converts the electrical signal to digital data, the data extraction unit 20 extracts data of a signal intensity of the light, and the gain analysis unit 21 analyzes a gain from the extracted data.

In analysis of the Brillouin gain, the Brillouin gain in the longitudinal direction of the measurement target optical fiber f is acquired from an intensity of light output from the one end of the measurement target optical fiber f using a Brillouin Optical Time Domain Analysis (BOTDA) method. Specifically, first, a signal intensity of the probe light, when the pump light is not inputted, extracted by the data extraction unit 20 is acquired as a reference intensity. Thereafter, a signal intensity, when the pump light and the probe light are inputted, extracted by the data extraction unit 20 is acquired. Further, the Brillouin gain can be acquired by calculating an increase amount from the reference intensity for the signal intensity when the pump light and the probe light are inputted. Through this measurement, it is possible to measure the loss in a predetermined mode at respective positions in a longitudinal direction of the measured optical fiber by comparing magnitudes of the Brillouin gains at the respective positions in the longitudinal direction of the measured optical fiber. Operations of at least the data extraction unit 20, the gain analysis unit 21, and calculations of the gain are implemented by a processor.

Brillouin Gain

The Brillouin gain generated in the measurement target optical fiber f will be described herein. Considering a stimulated Brillouin scattering phenomenon in the FMF as an example, the Brillouin frequency shift Vb in any mode is given as Equation (1).

Math. 1

$$v_b = \frac{2n_1 V_o}{\lambda} \tag{1}$$

In Equation (1), $n_i$ is an effective refractive index of the mode, $V_a$ is an effective velocity of acoustic waves, and λ is a wavelength.

According to Equation (1), it is shown that the Brillouin frequency shift differs depending on a propagation mode in the FMF, and it is understood that Brillouin spectrum information at any position in each mode to be obtained has a peak in each mode. The optical fiber loss measurement device of the present embodiment uses that the Brillouin gain (Brillouin spectrum information) at any position has a peak in each mode. Further, for simplicity, when an FMF in which two modes propagate is considered and each of the pump light and the probe light has an amplitude in both $LP_{01}$ and $LP_{11}$ modes, the light has the following three spectral peaks [1] to [3].

[1] $V_{01-01}$ (interaction between pump light and probe light components of $LP_{01}$)

[2] $v_{01-11}$ (interaction between a pump light component of $LP_{01}$ and a probe light component of $LP_{11}$, and interaction between a pump light component of $LP_{11}$ and a probe light component of $LP_{01}$)

[3] $v_{11-11}$ (interaction between pump light and probe light components of $LP_{11}$)

Here, A Brillouin gain $G_B(x, y)$ generated in the optical fiber when the Brillouin frequency corresponding to a mode in which a frequency difference between the pump light and the probe light propagates is set is expressed by Equation (2).

Math. 2

$$\iint G_B(x,y)dxdy = [\iint A_{ij}(x,y)E_p(x,y)E_s(x,y)dxdy]^2. \tag{2}$$

In Equation (2) above, x and y are coordinates in the optical fiber cross section, $A_{ij}(x, y)$ is an intensity distribution of the acoustic mode, and $E_p(x, y)$ and $E_s(x, y)$ are the intensity distributions of the pump light and the probe light, respectively. In Equation (2), because the intensity distribution of the acoustic mode is excited by the interaction between the pump light and the probe light, the intensity distribution can be regarded as the same as the overlapping of the electric field distributions.

On the other hand, the Brillouin gain changes depending on the overlapping of the electric field distributions of the pump light and the probe light. That is, when both of the electric field distributions of the pump light and the probe light change in the longitudinal direction of the optical fiber, an overlapping relationship changes and the generated gain also changes and thus, it is not possible to acquire the loss in each mode from a gain amount.

In the optical fiber loss measurement device of the present embodiment, in order to eliminate a change in a gain generation amount due to a change in the overlapping state of the electric field distributions of the pump light and the probe light, a mode in which the state of the electric field distribution is axisymmetric such as the basic mode in the probe light is selected, and the Brillouin gain is generated between this probe light and the pump light that is in a non-axisymmetric mode in which the electric field distribution can change. This configuration is an example, and for the pump light, the axisymmetric mode may be selected.

FIG. 2 is a diagram illustrating the pump light and the probe light at point A, and interaction therebetween. In FIG. 2, (a) illustrates a shape of an electric field intensity distribution in an optical fiber cross section of the probe light at point A, (b) illustrates a shape of the electric field intensity distribution in the optical fiber cross section of the pump light at point A, (c) illustrates a shape of the electric field intensity distribution in the optical fiber cross section of an interaction at point A, and (d) illustrates a shape of the electric field intensity distribution in the optical fiber cross section of the Brillouin gain at point A. In FIG. 2, respective areas with intensities of the probe light and the pump light are illustrated by hatching and black color, and for simplicity, a shape of the optical fiber cross section in the axisymmetric mode is rectangular. However, in reality, in the case of the axisymmetric mode, the shape of the optical fiber cross section is circular.

Here, the intensities Ep and Er of the pump light and the probe light illustrated in FIGS. 2(a) and 2(b) can be expressed by Equations (3) and (4), respectively.

Math. 3

$$E_p(x, y) = \begin{cases} I_p((a,b)) & (3 \le a \le 11 \text{ and } 3 \le b \le 5, 3 \le a \le 11 \text{ and } 9 \le b \le 11)) \\ 0 & \text{(otherwise)} \end{cases} \quad (3)$$

Math. 4

$$E_r(x, y) = \begin{cases} I_r((c,d)) & (3 \le c \le 11 \text{ and } 3 \le d \le 11)) \\ 0 & \text{(otherwise)} \end{cases} \quad (4)$$

In this case, because the pump light and the probe light interact with each other as illustrated in FIG. 2(c), the acquired Brillouin gain G is in a state illustrated in FIG. 2(d), that is, a relationship expressed in Equation (5).

Math. 5

$$\iint G_B(x, y) dx dy = \begin{cases} \left[ \iint A_{ij} E_p E_s((e,f))(3 \le e \le 11 \text{ and } 3 \le f \le 5, 3 \le e \le 11 \text{ and } 9 \le f \le 11)) dx dy \right]^2 \\ 0 \text{ (otherwise)} \end{cases} \quad (5)$$

According to Equation (5), it can be seen that the Brillouin gain is generated in an area corresponding to an overlap with the intensity distribution of the probe light in the cross-sectional direction of the optical fiber.

Here, a gain at point B different from point A in the longitudinal direction is considered. FIG. 3 is a diagram illustrating the pump light and the probe light at point B, and interaction therebetween. In FIG. 3, (a) illustrates a shape of an electric field intensity distribution in an optical fiber cross section of the probe light at point B, (b) illustrates a shape of the electric field intensity distribution in the optical fiber cross section of the pump light at point B, (c) illustrates a shape of the electric field intensity distribution in the optical fiber cross section of an interaction at point B, and (d) illustrates a shape of the electric field intensity distribution in the optical fiber cross section of the Brillouin gain at point B. In FIG. 3, respective areas with intensities of the probe light and the pump light are illustrated by hatching and black color, and for simplicity, a shape of the optical fiber cross section in the axisymmetric mode is rectangular. However, in reality, in the case of the axisymmetric mode, the shape of the optical fiber cross section is circular.

Here, the intensities Ep and Er of the pump light and the probe light illustrated in FIGS. 3(a) and 3(b) can be expressed by Equations (6) and (7), respectively.

Math. 6

$$E_p(x, y) = \begin{cases} I_p((a,b)) & (3 \le a \le 5 \text{ and } 3 \le b \le 11, 9 \le a \le 11 \text{ and } 3 \le b \le 11)) \\ 0 & \text{(otherwise)} \end{cases} \quad (6)$$

Math. 7

$$E_r(x, y) = \begin{cases} I_r((c,d)) & (1 \le c \le 13 \text{ and } 1 \le d \le 13)) \\ 0 & \text{(otherwise)} \end{cases} \quad (7)$$

The electric field intensity distribution in the cross-sectional direction of the probe light at point B is the same as that at point A because the mode is a mode in which the state of the electric field distribution is axisymmetric. In this case, because the pump light and the probe light interact with each other as illustrated in FIG. 3(c), the Brillouin gain G is in a state illustrated in FIG. 3(d), that is, a relationship expressed in Equation (8).

Math. 8

$$\iint G_B(x, y)dxdy = \begin{cases} \left[\iint A_{ij}E_P E_s((e, f)(3 \le e \le 5 \text{ and } 3 \le f \le 11, 9 \le e \le 11 \text{ and } 3 \le f \le 11))dxdy\right]^2 \\ 0 \text{ (otherwise)} \end{cases} \quad (8)$$

According to Equation (8), rotation states (interacting portions in the optical fiber cross section) differ, but the pump light and the probe light interact with each other as in point B.

Thus, in the optical fiber loss measurement device of the present embodiment, the Brillouin gain can be acquired under the same conditions even when the shape of the electric field distribution of the pump light changes due to propagation or the like, by using the mode in which the state of the electric field distribution in the probe light is axisymmetric. That is, it is possible to generate the Brillouin gain independently of the shape of the electric field distribution of the pump light.

Further, because the electric field distribution of the probe light is axisymmetric, it is possible to eliminate dependence of the Brillouin gain on a polarization by applying a polarization scrambler and averaging a gain amount. Specifically, in the optical fiber loss measurement device of FIG. 1, a polarization modulation unit that changes the polarization state of the probe light p2 is provided between the frequency control unit 14 and the axisymmetric mode conversion unit 16, and the gain analysis unit 21 may perform a process of averaging Brillouin gains of a plurality of polarization states. As the polarization modulation unit, for example, a wavelength plate can be used. When the polarization state of the probe light p2 is changed by the polarization modulation unit, the gain analysis unit 21 acquires Brillouin gains of a plurality of changed polarization states and averages the acquired Brillouin gains.

The state of axisymmetric electric field distribution means a mode in which the electric field distribution does not change even when light is rotated in an azimuth direction of the optical fiber cross section like $LP_{01}$, $LP_{02}$, and $L_{o3}$. Further, a frequency difference between the pump light and the probe light inputted to the measured optical fiber is set in the Brillouin frequency shift that acts between different modes, as described in the above [2]. This allows conditions of the overlapping of the pump light and the probe light to be the same in the longitudinal direction of the optical fiber.

Loss in Each Mode in Measurement Target Optical Fiber f

Next, a loss in each mode at each position in the longitudinal direction of the measurement target optical fiber f will be described. As an example, considering measurement of the loss in each mode in the FMF, when the overlapping state is made the same in the longitudinal direction, the Brillouin gain generated at a z point of the optical fiber can be expressed by Equation (9) below.

Math. 9

$$G_B(z) = g_B I_p(z) I_s(z) \quad (9)$$

In Equation (9), $g_B$ is a Brillouin gain coefficient, and $I_P$ and $I_S$ are respective integrated values in optical fiber cross-sectional areas of the pump light and the probe light.

Here, when the coordinate of a pump light incidence point is 0, the coordinate of a probe light incidence point is L, a loss coefficient of the optical fiber is α, and the Brillouin gain generated at a $z_1$ point is observed at the pump light incidence point, the observed Brillouin gain can be expressed by Equation (10).

Math. 10

$$\begin{aligned} G_B(z_1) &= g_B I_P(z_1) I_S(L-z_1)\alpha(z_1) \\ &= g_B I_P(0)\alpha(z_1) I_S(L)\alpha(L-z_1)\alpha(z_1) \\ &= g_B I_P(0) I_S(L)\alpha(L)\alpha(z_1) \end{aligned} \quad (10)$$

Similarly, the Brillouin gain at a $z_2$ point can be expressed by Equation (11).

Math. 11

$$G_B(z_2) = g_B I_P(0) I_S(L)\alpha(L)\alpha(z_2) \quad (11)$$

Here, the loss distribution from a certain point $z_1$ can be acquired by calculating Equation (12). In Equation (12), ln indicates a natural logarithm.

Math. 12

$$\ln\frac{G_B(z_2)}{G_B(z_1)} = \ln\frac{g_B I_P(0) I_S(L)\alpha(L)\alpha(z_2)}{g_B I_P(0) I_s(L)\alpha(L)\alpha(z_1)} = \ln\frac{\alpha(z_2)}{\alpha(z_1)} \quad (12)$$

From the above, it is possible to measure the loss in each mode of the FMF based on the certain point $z_1$ by analyzing the characteristics of stimulated Brillouin scattered light.

The measurement method in the optical fiber loss measurement device of the present embodiment includes the following four steps.

First step: Set the frequency difference between the pump light and the probe light. The frequency difference is set to correspond to the Brillouin frequency shift corresponding to a combination of the modes of the pump light and the probe light inputted to the measurement target optical fiber f.

Second step: The mode of the pump light is converted to a mode in which a loss is measured, and the mode of the probe light is converted to a mode in which the electric field distribution in the optical fiber cross section is axisymmetric.

Third step: The pump light and the probe light converted in the second step are inputted to the optical fiber.

Fourth step: the Brillouin gain is acquired from an output of the probe light and the loss is calculated.

According to the optical fiber loss measurement device of the present embodiment, the probe light is converted to an axisymmetric mode like $LP_{01}$, $LP_{02}$, and $LP_{03}$ in which the electric field distribution does not change, and the converted light is inputted to the measurement target optical fiber so that the Brillouin gain is generated. Thus, it is possible to nondestructively measure a loss from which the pump light suffers even when the electric field distribution of the pump light, which is a non-axisymmetric mode, changes at any position in the length direction of measurement target optical fiber. As a result, this makes it possible to determine whether a connection point, a device, or the like in a transmission line of the measurement target optical fiber is good.

Second Embodiment

Figure 4:
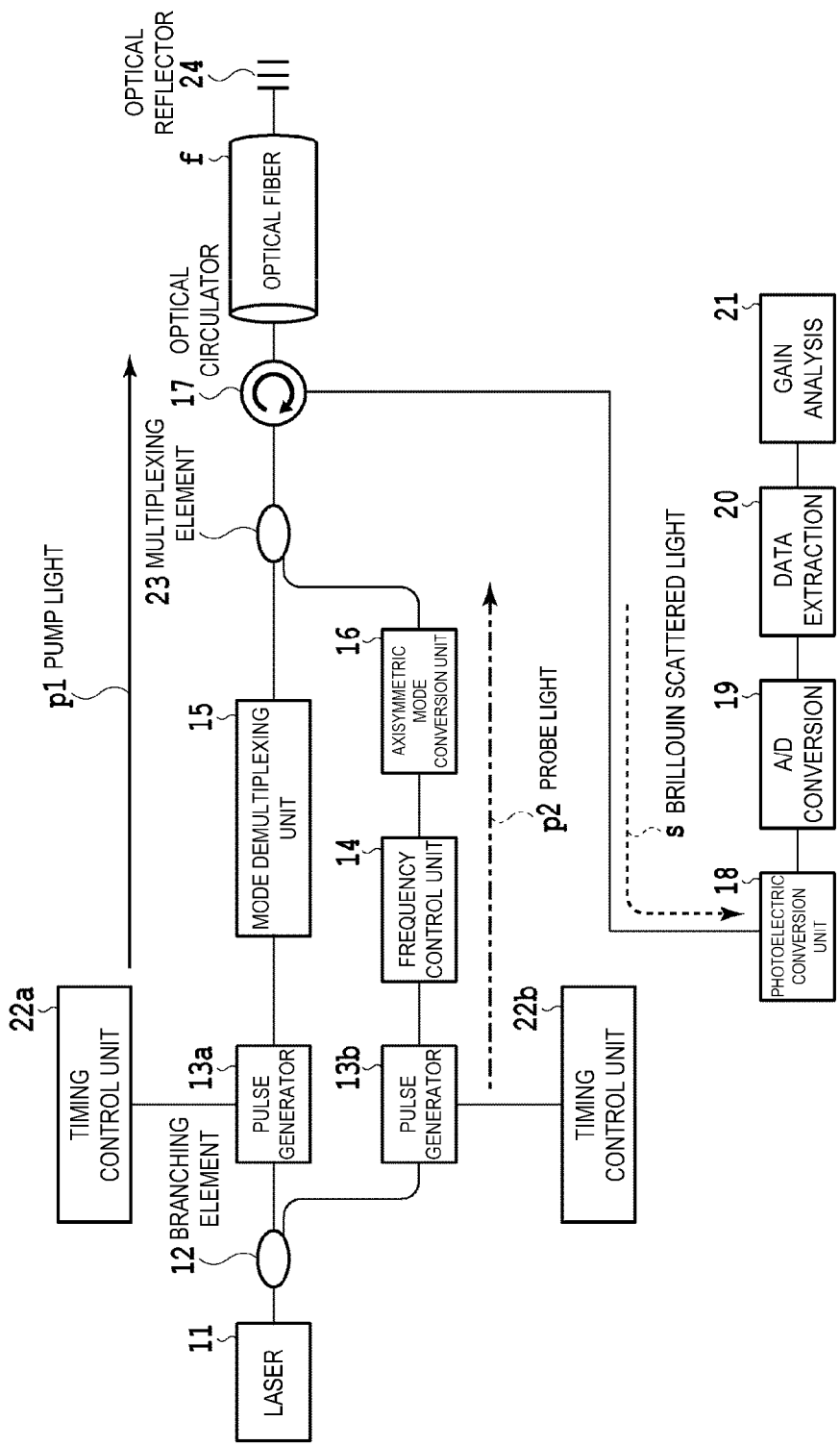
FIG. 4 is a diagram illustrating an example of an optical fiber loss measurement device according to a second embodiment.

FIG. 4 is a diagram illustrating an example of an optical fiber loss measurement device according to a second embodiment. In the optical fiber loss measurement device of the first embodiment, the pump light p1 is inputted to the measurement target optical fiber f from one side and the probe light p2 is inputted to the measurement target optical fiber f from the other side, whereas in the optical fiber loss measurement device of the present embodiment, the pump light p1 and the probe light p2 are inputted to the measurement target optical fiber f from the same end portion. The pump light p1 and the probe light p2 are inputted as pulses at different timings, the pump light p1 or the probe light p2 is reflected by an optical reflector provided on an end surface opposite to an incidence end of the measurement target optical fiber so that the two light beams interact, and an intensity of light output from the same end portion as the incidence end is measured. Because the configuration is otherwise the same as that of the first embodiment, description will be omitted.

In the optical fiber loss measurement device of the present embodiment illustrated in FIG. 4, pulse generators 13a and 13b and timing control units 22a and 22b are provided so that light beams obtained by the light output from the laser light generation unit 11 branching into two by the branching element 12 are converted to pulses at a predetermined timings. The two light beams converted to pulses at a predetermined timing in the pulse generators 13a and 13b and the timing control unit 22a and 22b are processed by the mode demultiplexing unit 15, and the frequency control unit 14 and the axisymmetric mode conversion unit 16, are multiplexed by the multiplexing element 23, and are inputted as the pump light p1 and the probe light p2 to the one end of the measurement target optical fiber f by the optical circulator 17.

The pulse generators 13a and 13b and the timing control units 22a and 22b convert the two light beams to pulses with a timing shift so that the pump light p1 and the probe light p2 are inputted to the measurement target optical fiber f with an incidence time difference according to each position of the measurement target optical fiber f.

In the optical fiber loss measurement device of the present embodiment illustrated in FIG. 4, an optical reflector 24 is provided at the other end that is opposite to the end portion of the measurement target optical fiber f connected to the optical circulator 17. Because the pump light p1 and the probe light p2 to the one end of the measurement target optical fiber f are inputted at different timings, the optical reflector 24 reflects the first incident light. A traveling direction of reflected light is reversed, and the two light beams propagate in opposite directions in the measurement target optical fiber f and collide to interact and generate the Brillouin gain. Because the Brillouin gain generated by the interaction is superimposed on the Brillouin scattered light s output from the one end of the measurement target optical fiber f, it is possible to measure a loss in each mode of the measurement target optical fiber f by observing the Brillouin gain.

In the optical fiber loss measurement device of the present embodiment, it is necessary to perform one measurement while changing the incidence time difference in order to acquire the loss distribution from the generated Brillouin gain. Specifically, the gain generated at the one end of the measurement target optical fiber f is acquired, slightly changing the incidence time difference, shifting a collision position, and acquiring the gain are repeated, and the Brillouin gain is finally acquired up to the other end of the measurement target optical fiber f so that the loss distribution is acquired from the Brillouin gain at each position of the fiber.

In the optical fiber loss measurement device of the present embodiment, one pump light p1 and one probe light p2 are inputted to the measurement target optical fiber in one gain measurement. Because output timings of the pulse of the probe light p2 (the Brillouin scattered light s) on which the Brillouin gain is superimposed and the pulse of the reflected and returned pump light p1 differ, it is possible to measure the Brillouin gain by adjusting a measurement timing of output light.

The configuration of the optical fiber loss measurement device of the embodiment described above is an example, and similarly, any means may be used as long as the configuration is a device configuration capable of providing an optical frequency difference corresponding to a frequency (wavelength) shift between the pump light and the probe light, exciting any propagation mode, and extracting amplified probe light in a time domain. Further, in a typical SMF, because the configuration of the optical fiber loss measurement device of the present embodiment can also be applied by shortening an inputted wavelength, it is only required that a condition that a plurality of modes propagate is established for a measured optical fiber.

REFERENCE SIGNS LIST

11 Laser light generation unit
12 Branching element
13 Pulse generator
14 Frequency control unit
15 Mode demultiplexing unit
16 Axisymmetric mode conversion unit
17 Optical circulator
18 Photoelectric conversion unit
19 A/D conversion unit
20 Data extraction unit
21 Gain analysis unit
22a, 22b Timing control unit
23 Multiplexing element
24 Optical reflector
f Measurement target optical fiber

The invention claimed is:
1. An optical fiber loss measurement device comprising:
a light source configured to input, to a measurement target optical fiber in which a plurality of modes propagate, pump light at a first frequency in a predetermined mode and probe light at a second frequency lower than the first frequency by a frequency corresponding to a Brillouin frequency shift in the predetermined mode;
a photoelectric conversion element configured to convert a light output from the measurement target optical fiber to an electric signal;

a processor configured to acquire Brillouin gains in a longitudinal direction of the measurement target optical fiber using a Brillouin Optical Time Domain Analysis (BOTDA) method based on the electric signals and calculate a loss in the predetermined mode of the measurement target optical fiber by comparing magnitudes of the Brillouin gains at respective positions in the longitudinal direction of the measurement target optical fiber, wherein the probe light is in a mode in which an electric field distribution in a cross section of the measurement target optical fiber is axisymmetric regardless of the mode of the pump light.

2. The optical fiber loss measurement device according to claim 1, wherein the light source is configured to inputs the pump light to a first end of the measurement target optical fiber and inputs the probe light to a second end of the measurement target optical fiber, and the photoelectric conversion element is configured to convert a light output from the second end of the measurement target optical fiber to the electric signal.

3. The optical fiber loss measurement device according to claim 1, further comprising:

a light reflector provided at an end face of the measurement target optical fiber opposite to a light incident end, wherein the light source is configured to pulse the pump light and the probe light and inputs the pulsed pump light and the pulsed probe light at different timings to the first end of the measurement target optical fiber, and the photoelectric conversion element is configured to convert a light reflected from the light reflection unit and output from the first end of the measurement target optical fiber to the electric signal.

4. The optical fiber loss measurement device according to claim 1, further comprising:

the probe light inputted to the second end of the measurement target optical fiber is changed to a plurality of polarization states; and the processor is further configured to average the Brillouin gains of the plurality of polarization states.

5. The optical fiber loss measurement device according to claim 1, wherein the predetermined mode of the pump light is a mode in which an electric field distribution in a cross section of the measurement target optical fiber is non-axisymmetric.

6. The optical fiber loss measurement device according to claim 1, wherein an electric field distribution in a cross section of the measurement target optical fiber of the pump light inputted to the measurement target optical fiber is rotated.

7. An optical fiber loss measurement method comprising:

inputting, to a measurement target optical fiber in which a plurality of modes propagate, light at a first frequency in a predetermined mode of the plurality of modes as pump light, and inputting, to the measurement target optical fiber, light at a second frequency lower than the first frequency by a frequency corresponding to a Brillouin frequency shift in the predetermined mode as probe light;

measuring an intensity of light output from the measurement target optical fiber to acquire Brillouin gains in a longitudinal direction of the measurement target optical fiber using a Brillouin Optical Time Domain Analysis (BOTDA) method; and measuring a loss in the predetermined mode of the measurement target optical fiber by comparing magnitudes of the Brillouin gains at respective positions in the longitudinal direction of the measurement target optical fiber, wherein the probe light is in a mode in which an electric field distribution in a cross section of the measurement target optical fiber is axisymmetric regardless of the mode of the pump light.

* * * * *